(12) United States Patent
Yagishita et al.

(10) Patent No.: US 10,629,859 B2
(45) Date of Patent: Apr. 21, 2020

(54) COIN-SHAPED BATTERY

(71) Applicant: Panasonic Intellectual Property Management Co., Ltd., Osaka (JP)

(72) Inventors: Tomohiro Yagishita, Osaka (JP); Tadayoshi Takahashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 209 days.

(21) Appl. No.: 15/559,857

(22) PCT Filed: Dec. 16, 2016

(86) PCT No.: PCT/JP2016/005160
§ 371 (c)(1),
(2) Date: Sep. 20, 2017

(87) PCT Pub. No.: WO2017/122250
PCT Pub. Date: Jul. 20, 2017

(65) Prior Publication Data
US 2018/0062119 A1 Mar. 1, 2018

(30) Foreign Application Priority Data
Jan. 12, 2016 (JP) .................. 2016-003585

(51) Int. Cl.
*H01M 2/02* (2006.01)
*H01M 2/08* (2006.01)
*H01M 2/04* (2006.01)

(52) U.S. Cl.
CPC ......... *H01M 2/0222* (2013.01); *H01M 2/026* (2013.01); *H01M 2/0257* (2013.01);
(Continued)

(58) Field of Classification Search
CPC combination set(s) only.
See application file for complete search history.

(56) References Cited

U.S. PATENT DOCUMENTS

2003/0211387 A1* 11/2003 Braunger ............ H01M 2/0272
429/175
2006/0208346 A1* 9/2006 Kimura ............... H01M 2/0222
257/666

(Continued)

FOREIGN PATENT DOCUMENTS

| CN | 1447458 A | 10/2003 |
|---|---|---|
| CN | 101171700 A | 4/2008 |

(Continued)

OTHER PUBLICATIONS

International Search Report of PCT application No. PCT/JP2016/005160 dated Feb. 21, 2017.
(Continued)

*Primary Examiner* — Christopher P Domone
(74) *Attorney, Agent, or Firm* — McDermott Will & Emery LLP

(57) ABSTRACT

A coin type battery includes: a battery case having a bottom plate and a side portion rising from a rim of the bottom plate; a sealing plate having a top plate and a rim portion extending from the top plate to the inside of the side portion; a gasket compressed and interposed between the side portion and the rim portion; and a power generation element sealed by the battery case and the sealing plate. At least one of the battery case and the sealing plate includes a plated layer disposed on the outer surface side, and a substrate layer disposed on the inner surface side of the plated layer. The plated layer includes at least two metals selected from a set consisting of nickel, zinc, and tin.

8 Claims, 1 Drawing Sheet

(52) U.S. Cl.
CPC ....... *H01M 2/0292* (2013.01); *H01M 2/0413* (2013.01); *H01M 2/08* (2013.01)

(56) References Cited

U.S. PATENT DOCUMENTS

| | | |
|---|---|---|
| 2006/0246353 A1 | 11/2006 | Guo et al. |
| 2008/0102360 A1 | 5/2008 | Stimits et al. |
| 2011/0159354 A1* | 6/2011 | Pytlik .................. H01M 2/027 429/174 |
| 2013/0230763 A1* | 9/2013 | Akca .................. H01M 2/0222 429/164 |
| 2014/0170472 A1* | 6/2014 | Hattori ................ H01M 2/0222 429/174 |

FOREIGN PATENT DOCUMENTS

| | | |
|---|---|---|
| CN | 103718331 A | 4/2014 |
| JP | 59-046756 | 3/1984 |
| JP | 4-312762 | 11/1992 |
| JP | 2008-539553 | 11/2008 |
| JP | 2010-508641 | 3/2010 |

OTHER PUBLICATIONS

English Translation of Chinese Search Report dated Nov. 5, 2019 for the related Chinese Patent Application No. 201680023397.3.

* cited by examiner

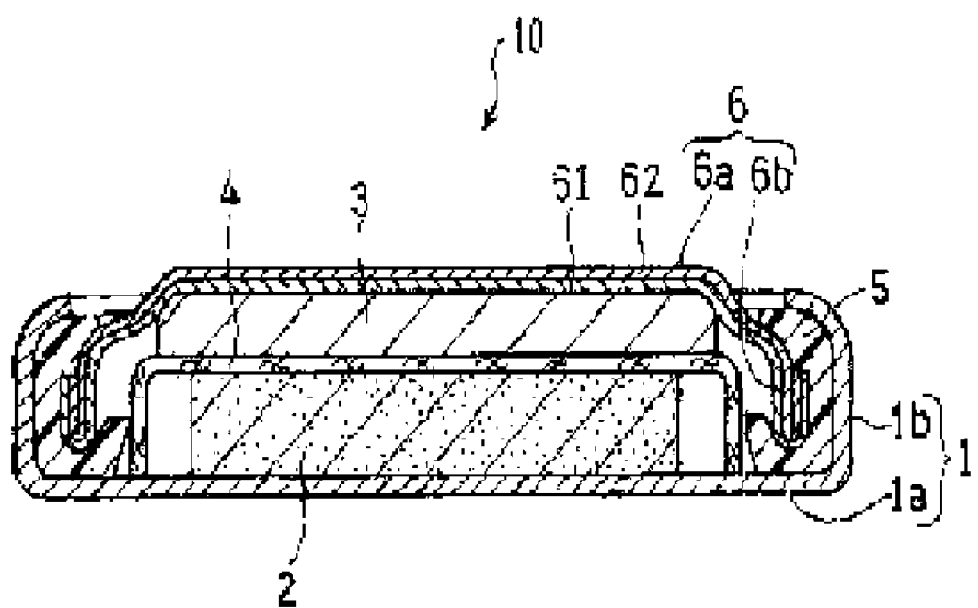

COIN-SHAPED BATTERY

This application is a U.S. national stage application of the PCT International Application No. PCT/JP2016/005160 filed on Dec. 16, 2016, which claims the benefit of foreign priority of Japanese patent application 2016-003585 filed on Jan. 12, 2016, the contents all of which are incorporated herein by reference.

TECHNICAL FIELD

The present invention relates to a coin type battery, and more specifically to a coin type battery having a high safety from accidental ingestion or swallow.

BACKGROUND ART

Coin type batteries are widely used as power sources for small apparatuses or memory backup. The application of the coin type batteries is continually expanded. So, countermeasures against accidental ingestion of a coin type battery become more important. When a coin type battery has been ingested or swallowed into a living body, the terminal surface of each of a case and a sealing plate of the coin type battery comes into contact with a body fluid, thereby promoting the electrolysis of water. The pH of body fluid is around neutral. As the electrolysis of water proceeds, the body fluid near the terminal surface on the negative electrode side shifts to alkaline, and the body fluid near the terminal surface on the positive electrode side shifts to acidic. Therefore, the living body is damaged.

From the viewpoint of preventing accidental ingestion, Patent Literature 1 proposes the production of a conductive film containing a bitter substance on a battery surface.

CITATION LIST

Patent Literature

PTL 1: Unexamined Japanese Patent Publication No. H04-312762

SUMMARY OF THE INVENTION

However, in the case of ingestion of a coin type battery into a living body without spitting out, the method of Patent Literature 1 is difficult to prevent the above mentioned damage.

From the above-mentioned problems, the objective of the present disclosure is to provide a highly safe coin type battery that can reduce the damage to a living body by accidental ingestion.

A coin type battery of the present disclosure includes the following components:

a battery case having a bottom plate and a side portion rising from a rim of the bottom plate;

a sealing plate having a top plate and a rim portion extending from the top plate to the inside of the side portion;

a gasket compressed and interposed between the side portion and the rim portion; and a power generation element sealed by the battery case and the sealing plate.

At least one of the battery case and the sealing plate includes a plated layer disposed on the outer surface side, and a substrate layer disposed on the inner surface side of the plated layer. The plated layer includes at least two metals selected from a set consisting of nickel, zinc, and tin.

The present disclosure can reduce the damage to a living body by accidental ingestion of a coin type battery.

BRIEF DESCRIPTION OF DRAWINGS

FIG. 1 is a vertically sectional view of a coin type battery in accordance with an embodiment of the present invention.

DESCRIPTION OF EMBODIMENT(S)

A coin type battery of embodiments of the present invention includes a power generation element, and an exterior body for sealing and storing the power generation element. The exterior body includes the following components:

a bottomed battery case having an opening;

a sealing plate for blocking the opening in the battery case; and a gasket interposed between an end (opening end) of a side portion of the battery case and a rim portion of the sealing plate.

The power generation element includes: a first electrode; a second electrode; a separator interposed between them; and an electrolyte. The power generation element is filled into a space formed of the battery case and the sealing plate. Then, the opening end of the battery case is caulked to the rim portion of the sealing plate via the gasket. Thus, the power generation element is sealed and stored in the exterior body. The coin type battery includes not only a coin-shaped battery but also a button-shaped battery. In other words, the shape and diameter of the coin type battery are not particularly limited. For example, the coin type battery of the present invention also includes a button-shaped battery whose thickness is greater than the diameter.

In more detail, the battery case includes a bottom plate, and a side portion rising from the rim of the bottom plate. The bottom plate normally has a circular shape, but may have a shape (for example, elliptical shape) close to the circular shape. The sealing plate includes a top plate, and a rim portion extending from the top plate to the inside of the side portion of the battery case. The top plate corresponds to the shape of the bottom plate, and has a circular shape having a diameter smaller than that of the bottom plate. Thickness T of the coin type battery is often normally smaller than diameter D of the bottom plate (T<D). For example, 1.2 mm≤T≤5.0 mm, and 9 mm≤D≤24.5 mm are established. The gasket is compressed and interposed between the side portion of the battery case and the rim portion of the sealing plate. In this, at least one of the battery case and the sealing plate includes a plated layer disposed on the outer surface side. The plated layer includes at least two metals selected from a set consisting of nickel, zinc, and tin.

The polarity of the first electrode is different from that of the second electrode. So, when the first electrode is a positive electrode (or negative electrode), the second electrode is a negative electrode (or positive electrode). When the coin type battery is a lithium battery, the positive electrode is stored in the exterior body so as to face the bottom plate of the battery case, and the negative electrode is stored in it so as to face the top plate of the sealing plate. The arrangement of the positive electrode and negative electrode is not limited to this.

The plated layer disposed on the outer surface of the battery case or sealing plate includes at least two metals selected from a set consisting of nickel, zinc, and tin. In the case of accidental ingestion or swallow of the coin type battery, on the negative electrode side, the plated layer suppresses the water electrolysis reaction by a contact of the sealing plate with a body fluid. On the positive electrode side, the plated layer suppresses the corrosion reaction of the battery case.

Usually, the exterior body of a coin type battery is made of stainless steel having a nickel-plated layer on its outer surface. In the case of accidental ingestion of the coin type battery having this exterior body, the electrolysis reaction of water proceeds in the body. In other words, on the negative electrode side, hydrogen is generated by the electrolysis of water, and the body fluid shifts to the alkaline side. As a result, the nickel on the outer surface dissolves to expose the stainless steel to the outside. Stainless steel has a hydrogen overvoltage lower than that of nickel, so that the water electrolysis reaction is more activated and the body fluid around the negative electrode shifts to a strong alkaline side. While, on the positive electrode side, the nickel and stainless steel are dissolved by a corrosion reaction, and the body fluid around the positive electrode shifts to a strong acid side.

In the present invention, a plated layer containing at least two metals selected from a set consisting of nickel, zinc, and tin is disposed on the outer surface side of a substrate layer in the sealing plate that is electrically connected to the negative electrode or in the battery case that is electrically connected to the positive electrode.

In the case that the sealing plate includes the plated layer, a local battery reaction between metals having different ionization tendencies proceeds in the plated layer, and a dissolving reaction is suppressed. Therefore, the exposure of the substrate layer to the outside can be prevented, and the generation of hydrogen can be significantly suppressed. Furthermore, the hydrogen overvoltage of tin or zinc is higher than that of nickel, so that the water electrolysis reaction rate on a surface of the plated layer can be reduced. As a result, the shift of the body fluid around the negative electrode to a strong alkaline side is significantly reduced.

While, in the case that the battery case includes the plated layer, the dissolution of the plated layer by a corrosion reaction is suppressed, so that the shift of the body fluid around the positive electrode to a strong acid side can be suppressed. In a normal battery case, the substrate layer is exposed on the end surface of the opening end. Therefore, in the battery case including a nickel-plated layer, crevice corrosion proceeds between the substrate layer and the nickel-plated layer due to a contact with the body fluid. In the case that the plated layer of the present invention is used, however, reaction products of tin or zinc suppress the shift of the inside of the crevice to a strong acid side, thereby delaying the crevice corrosion.

As the plated layer disposed on the outer surface, a nickel-zinc plated layer is preferable because it has a high hardness. In the sealing plate, a nickel-zinc plated layer or a zinc-tin plated layer is preferable because it has a high hydrogenating voltage and has a great effect of suppressing hydrogen generation.

The plated layer includes at least two metals selected from a set consisting of nickel, zinc, and tin. In the case that the plated layer includes nickel—as the essential metal—and another metal, namely in the case that a nickel-zinc plated layer or a nickel-tin plated layer is produced, the amount of nickel is preferably 30 mass % or less in the composition of the plated layer. When the percentage of nickel is higher than 30 mass %, the anti-corrosion effect by a local battery is reduced to promote the corrosion reaction of the nickel. While, when the percentage of nickel is lower than 5 mass % for example, the dissolution of zinc or tin by a corrosion reaction and the dissolving reaction by alkali are apt to occur. Therefore, the effect of suppressing the water electrolysis reaction reduces. Thus, the amount of nickel is more preferably 5 to 20 mass %, still more preferably 7 to 17 mass %.

In the case of producing a zinc-tin plated layer including zinc and tin as the two metals, the amount of zinc is preferably 35 mass % or less in the composition of the plated layer. When the percentage of zinc is higher than 35 mass %, the plated layer is difficult to be produced. While, when the percentage of zinc is lower than 1 mass % for example, an oxidation reaction of tin is apt to occur, thereby increasing the contact resistance on a battery surface. On the positive electrode side, the dissolving reaction of tin is apt to proceed, thereby reducing the effect of suppressing the water electrolysis reaction. Therefore, the percentage of zinc is preferably 1 to 30 mass %, more preferably 5 to 15 mass %.

The plated layer may include nickel, zinc, and tin. In this case, preferably, the percentages of zinc and tin are adjusted so as to be the above-mentioned percentages for the same reason.

Preferably, the amount of nickel is adjusted so that the percentage of nickel in the whole plated layer is 1 to 10 mass %.

The thickness of the plated layer is preferably 0.5 to 10 μm, more preferably 1 to 3 μm. On the outer surface or inner surface of this plated layer, a nickel-plated layer may be further disposed. Nickel has a great effect of reducing the contact resistance, and is easily dissolved in the environment in a living body. Therefore, in case of disposing the nickel plate on the outer surface, the plated layer of the present invention is rapidly exposed in the living body, so that, the abovementioned function is not inhibited. While, in case of disposing the nickel plate on the inner surface, heat treatment, for example, result in that the nickel is alloyed with the substrate layer or the plated layer of the present invention. Therefore, a thin material can be produced, so that the contact resistance between the substrate layer and the plated layer of the present invention can be reduced, and the long-term use performance of the battery can be improved. Preferably, the thickness of the nickel-plated layer is 1 to 3 μm.

The substrate layer of the sealing plate is a main material forming the frame of the sealing plate. In order to obtain a frame of a high strength, it is preferable to employ at least one selected from a set consisting of stainless steel, ordinary steel, and carbon steel. In order to keep the corrosion resistance to a power generation element and suppress the increase in the internal resistance, it is preferable to employ stainless steel. The substrate layer may be a laminated body of stainless steel, and ordinary steel and/or carbon steel. Types of the stainless steel include: 400-series ferritic stainless steel such as SUS430, SUS444, or SUS447; 300-series austenitic stainless steel such as SUS304, SUS305, or SUS316; and two-phase stainless steel such as SUS329. A nickel alloy such as NAS254 or NAS354 having a composition similar to that of the stainless steel may be employed.

The ordinary steel is steel such as an SS material, an SM material, and an SPCC material defined by Japanese Industrial Standards (JIS). The carbon steel is steel such as S10C, S20C, S30C, S45C, and S55C, and belongs to a mechanical structural alloy steel. When the ordinary steel or carbon steel is employed for the substrate layer of the battery, however, it is desirable that a nickel-plated layer for corrosion prevention is produced on the inside of the battery.

The substrate layer of the battery case is not particularly limited as long as it has a corrosion resistance and strength. Stainless steel, ordinary steel, carbon steel, titanium, cladding material (for example, cladding material of aluminum and stainless steel) can be employed.

Hereinafter, a coin type battery of the embodiment of the present invention is described with reference to the accompanying drawing. However, the following embodiment does not limit the technological scope of the present invention.

Power generation elements are stored in the exterior body. The power generation elements include positive electrode 2, negative electrode 3, separator 4, and an electrolyte (not shown). In the shown example, positive electrode 2 is disposed so as to face bottom plate 1*a* of battery case 1. Battery case 1 serves as a positive electrode terminal. While, negative electrode 3 is disposed so as to face top plate 6*a* of sealing plate 6. Sealing plate 6 serves as a negative electrode terminal As the material of battery case 1, preferably, a metal plate having a corrosion resistance at a positive electrode potential is employed as a substrate layer. For example, it is preferable that stainless steel (for example, SUS430, SUS444, or SUS329J) is employed for battery case 1 of a lithium battery. Furthermore, it is preferable to employ a material (not shown in FIG. 1) having, on its outer surface, a plated layer that includes at least two metals selected from a set consisting of nickel, zinc, and tin.

Preferably, the materials of sealing plate 6 include: stainless steel, ordinary steel, or carbon steel as substrate layer 61; and a material having, on its outer surface, plated layer 62 including at least two metals selected from a set consisting of nickel, zinc, and tin. As substrate layer 61, it is preferable to employ stainless steel (for example, SUS304, SUS316, or SUS430) because it is stable for lithium metals.

In the case of accidental ingestion of the coin type battery into a living body, a local battery is produced between different metals included in the plated layer, thereby suppressing the dissolution of the plated layer. Therefore, when the plated layer is disposed on the sealing plate, the hydrogen generation around the negative electrode is suppressed, thereby reducing the shift to a strong alkaline side. While, when the plated layer is disposed on the battery case, the corrosion resistance of the metals included in the plated layer is suppressed, thereby reducing the shift to a strong acid side.

Next, taking a lithium battery as an example, a manufacturing method of a coin type battery is described. The manufacturing method of the coin type battery includes the following processes:

(a) preparing power generation elements;
(b) preparing a battery case;
(c) preparing a sealing plate;
(d) preparing a gasket; and
(e) storing the power generation elements in the battery case, blocking the opening in the battery case with the sealing plate, and caulking the opening end of the battery case to a rim portion of the sealing plate via the gasket.

The thickness of the material used for the sealing plate is 0.2 to 0.3 mm, for example. The thickness of the material used for the battery case is 0.1 to 0.3 mm, for example.

In process (b), a battery case is produced by drawing stainless steel having a plated layer on its surface into a bottomed cylindrical shape so that the plated layer forms the outer surface. The plated layer is, for example, a nickel-zinc plated layer, a nickel-tin plated layer, or a zinc-tin plated layer.

In process (c), a sealing plate having a predetermined shape is produced, by pressing stainless steel that has a plated layer on its surface so that the plated layer forms the outer surface. The plated layer is, for example, a nickel-zinc plated layer, a nickel-tin plated layer, or a zinc-tin plated layer.

In process (d), a gasket is prepared which has an annular groove engaging with the rim portion of the sealing plate. The gasket may be previously mounted on the rim portion of the sealing plate. As the material of the gasket, polypropylene (PP), polyphenylene sulfide (PPS), or polyether ether ketone (PEEK) can be employed, for example.

In process (e), the power generation elements are stored in the battery case, and the sealing plate is disposed so as to block the opening in the battery case. Then, the opening end of the battery case is folded inward. Thus, the gasket is compressed, and the lower end of the gasket tightly comes into contact with the bottom plate of the battery case. The upper end of the gasket tightly comes into contact with the rim portion of the sealing plate.

Next, taking a lithium battery as an example, the power generation elements of the coin type battery are described.

A positive electrode is produced by pressure-forming a positive electrode material mixture into a coin shape. The positive electrode material mixture includes a positive electrode active material, a conductive auxiliary agent, and a binder. The type of the positive electrode active material is not especially limited, but may be an oxide (for example, manganese dioxide) or composite oxide that contains at least one selected from a set consisting of transition metals such as manganese, cobalt, nickel, magnesium, copper, iron, and niobium. Alternatively, a composite oxide (for example, $LiCoO_2$) may be employed which contains lithium and at least one selected from a set consisting of metals such as manganese, cobalt, nickel, magnesium, copper, iron, and niobium. Alternatively, graphite fluoride may be employed. The positive electrode active materials may be employed singly or in combination.

As the conductive auxiliary agent, carbon black such as acetylene black or ketjen black, or graphite such as artificial graphite can be employed. The conductive auxiliary agents may be employed singly or in combination.

As the binder, fluorine resin, styrene-butadiene rubber (SBR), modified acrylonitrile rubber, or ethylene-acrylic acid copolymer is employed, for example. The binders may be employed singly or in combination.

The negative electrode includes a lithium metal or lithium alloy molded in a coin shape, for example. As the lithium alloy, a Li—Al alloy, a Li—Sn alloy, a Li—Si alloy, or a Li—Pb alloy is employed. The negative electrode may be produced by pressure-forming, into a coin shape, a negative electrode material mixture that contains a negative electrode active material and a binder. The type of the negative electrode active material is not especially limited. However, examples of the negative electrode active material include: a carbon material such as natural graphite, artificial graphite, or non-graphitizable carbon; and a metal oxide such as silicon oxide, lithium titanate, niobium pentoxide, or molybdenum dioxide. As the binder, the above mentioned material available for the positive electrode can be optionally employed, for example. The negative electrode material mixture may contain a conductive auxiliary agent.

The electrolyte includes a nonaqueous solvent, and a solute (salt) dissolving in the nonaqueous solvent. Preferably, the solute concentration in the electrolyte is 0.3 to 2.0 mol/L. As the nonaqueous solvent, cyclic carbonate, chain carbonate, chain ether, or cyclic ether can be employed. These nonaqueous solvents may be employed singly or in combination. As the solute, $LiBF_4$, $LiPF_6$, $LiClO_4$, $LiCF_3SO_3$, $LiC_4F_9SO_3$, $LiN(CF_3SO_2)_2$, or $LiN(C_2F_5SO_2)_2$ is employed.

The separator may be made of any material as long as the material can prevent a short circuit between the positive electrode and the negative electrode. For example, woven fabric, nonwoven fabric, or microporous film made of polyolefin or polyester is employed.

Next, the present invention is specifically described on the basis of examples. However, the following examples do not limit the present invention.

EXAMPLE 1

In the present example, a coin type battery having a structure shown in FIG. 1 is produced.

(1) Battery Case

As a material of battery case 1, a stainless steel plate (SUS430) of a thickness of 200 μm is prepared which has a nickel-plated layer of a thickness of 1 μm. By drawing this material so that the nickel-plated layer is disposed on the outer surface side, battery case 1 is produced in which the diameter of the bottom plate is 20 mm and the height of side portion 1b is 2.8 mm (2) Sealing Plate A material is prepared in which nickel-zinc plated layer 62 of a thickness of 3 μm is produced on a surface of a stainless steel plate (SUS430) of a thickness of 250 μm. The stainless steel plate serves as substrate layer 61. Nickel-zinc plated layer 62 is produced so as to contain nickel by 12 mass %. By pressing this material so that nickel-zinc plated layer 62 forms the outer surface, sealing plate 6 in which the diameter of top plate 6a is 17 mm is produced.

(3) Power Generation Element

A positive electrode material mixture is prepared, by mixing 100 pts·mass of manganese dioxide as a positive electrode active material, 7 pts·mass of graphite as a conductive auxiliary agent, and 5 pts·mass of polytetrafluoroethylene as a binder. Positive electrode 2 is produced by molding the positive electrode material mixture into a coin shape of a diameter of 15 mm and a thickness of 2 mm. While, a negative electrode is produced by punching a metal lithium foil of a thickness of 0.6 mm into a circular shape of a diameter of 16 mm. As the electrolyte, an organic electrolyte is produced by dissolving, at a concentration of 1.0 mol/L, $LiClO_4$ as a solute in a nonaqueous solvent. The nonaqueous solvent is obtained by mixing propylene carbonate and 1,2-dimethoxyethane at a volume ratio of 2:1.

(4) Assembling of Coin Type Battery

Gasket 5 that is made of polypropylene and is coated with a sealant made of blown asphalt and mineral oil is disposed inside side portion 1b of battery case 1, a current collector made of SUS430 is disposed on bottom plate 1a, and positive electrode 2 is disposed on the current collector. Next, polypropylene-made nonwoven fabric of a thickness of 300 μm is disposed as separator 4 on positive electrode 2. Then, the organic electrolyte is injected into battery case 1. Negative electrode 3 is pasted on the inside of top plate 6a of sealing plate 6. Next, sealing plate 6 is disposed so as to block the opening in battery case 1, and the end of side portion 1b of battery case 1 is caulked to rim portion 6b of sealing plate 6 via gasket 5. Thus, coin type battery A1 having a diameter of 20 mm, a thickness of 3.2 mm, and a capacity of 225 mAh is completed.

Next, coin type battery A2 is completed as in the case of battery A1 except that a nickel-tin plated layer containing nickel by 12 mass % is produced instead of a nickel-zinc plated layer disposed on the outer surface of the sealing plate. Next, coin type battery A3 is completed as in the case of battery A1 except that a zinc-tin plated layer containing zinc by 12 mass % is produced instead of a nickel-zinc plated layer disposed on the outer surface of the sealing plate.

Furthermore, coin type battery B1 is completed as in the case of battery A1 except that a nickel-plated layer is produced instead of a nickel-zinc plated layer disposed on the outer surface of the sealing plate.

[Evaluation]

Thus, 10 coin type batteries A1, 10 coin type batteries A2, 10 coin type batteries A3, and 10 coin type batteries B1 are prepared. Processed meat (ham) made of pork is placed on the bottom of a petri dish of a depth of 15 mm. Then, instead of the body fluid, normal saline is poured into the petri dish to completely dip the ham into the normal saline. Then, a battery to be evaluated is mounted on the ham so that the sealing plate comes into contact with the ham. At this time, the bottom surface of the battery case is set slightly lower than the liquid level of the normal saline so that the battery does not float, thereby creating the state in which a film of the saline is formed on the case bottom surface. This state is kept at 25° C. for 30 minutes. Then, the state of the contact part of the ham with the sealing plate is observed visually. At this time, discoloration is hardly observed in the ham on which each of batteries A1, A2, and A3 is mounted. While, a strong discoloration is observed in the ham on which battery B1 is mounted. Ten batteries in each example show the same trend.

Next, the pH of the contact surface of the ham with the sealing plate is measured, and the average value of 10 values is calculated. The result is shown in Table 1. Battery B1 indicates a strong alkalinity. However, the shift to an alkaline side is suppressed in each of batteries A1, A2, and A3 that have a nickel-zinc plated layer, nickel-tin plated layer, or zinc-tin plated layer on the outer surface of the sealing plate.

TABLE 1

|  | A1 | A2 | A3 | B1 |
| --- | --- | --- | --- | --- |
| Plated layer on sealing plate | Nickel-zinc | Nickel-tin | Zinc-tin | Nickel |
| Plated layer on battery case | Nickel | Nickel | Nickel | Nickel |
| Discoloration | Almost no | Almost no | Almost no | Strong |
| pH | 6.8 | 6.7 | 6.9 | >14 |

EXAMPLE 2

Coin type batteries A4 to A9 are produced as in the case of battery A1 except that the composition of the nickel-zinc plated layer is changed, and an evaluation similar to that in example 1 is applied to them. The result is shown in Table 2. In batteries A4 to A7, the pH is stable similarly to battery A1. While, in battery A8 having a large amount of nickel and battery A9 having a small amount of nickel, the pH shifts to an alkaline side. Discoloration is hardly observed in the ham on which each of batteries A4 to A7 is mounted, but slight discoloration is observed in the ham on which each of batteries A8 and A9 is mounted. Ten batteries in each example show the same trend. This is probably because increase in the percentage of nickel or zinc reduces the anti-corrosion effect by a local battery between nickel and zinc, causes the elution of nickel or zinc, and increases the amount of generation of hydrogen.

TABLE 2

|  | A1 | A4 | A5 | A6 | A7 | A8 | A9 |
|---|---|---|---|---|---|---|---|
| Amount of nickel in plated body (%) | 12 | 20 | 17 | 7 | 5 | 30 | 3 |
| Amount of zinc in plated body (%) | 88 | 80 | 83 | 93 | 95 | 70 | 97 |
| Discoloration | Almost no | Almost no | Almost no | Almost no | Almost no | Slight | Slight |
| pH | 6.8 | 6.8 | 6.7 | 6.8 | 7 | 8.7 | 9.3 |

A nickel-zinc plated layer is produced on the outer surface of the sealing plate in example 2, but a similar trend is considered to be obtained even when a nickel-tin plated layer is formed.

EXAMPLE 3

Coin type battery A10 is produced as in the case of battery B1 except that a material having a nickel-zinc plated layer of a thickness of 1 μm is used on the surface of a stainless steel plate (SUS430) of a thickness of 200 μm as a substrate layer in the battery case. At this time, the nickel-zinc plated layer is produced so as to contain nickel by 12 mass %.

Next, coin type battery A11 is produced as in the case of battery A10 except that a sealing plate having a nickel-zinc plated layer is used similarly to battery A1.

Next, coin type battery A12 is completed as in the case of battery A10 except that, instead of the nickel-zinc plated layer on the battery case, a nickel-tin plated layer containing nickel by 12 mass % is produced.

Next, coin type battery A13 is completed as in the case of battery A10 except that, instead of the nickel-zinc plated layer on the battery case, a zinc-tin plated layer containing zinc by 12 mass % is produced.

An evaluation similar to that in example 1 is applied to batteries A10 to A13. The result is shown in Table 3.

In each of batteries A10 to A13 having a nickel-zinc plated layer, nickel-tin plated layer, or zinc-tin plated layer on the outer surface of the battery case, the shift to an acid side is suppressed. Especially, battery A11 having a nickel-zinc plated layer on both of the battery case and sealing plate indicates a value closer to the neutral.

Thus, it is clear that producing the above-mentioned plated layer on at least one of the sealing plate and battery case can significantly reduce the damage to the living body even in the case of accidental ingestion of the coin type battery into a living body.

TABLE 3

|  | A10 | A11 | A12 | A13 |
|---|---|---|---|---|
| Plated layer on sealing plate | Nickel | Nickel-zinc | Nickel | Nickel |
| Plated layer on battery case | Nickel-zinc | Nickel-zinc | Nickel-tin | Zinc-tin |
| Discoloration | Almost no | Almost no | Almost no | Almost no |
| pH | 7.6 | 6.9 | 7.8 | 7.9 |

The present invention can be applied to various batteries—such as a lithium battery, an alkaline battery, and an alkaline storage battery—including a primary battery and secondary battery. The present invention is especially useful for a battery (for example, lithium battery) having a battery voltage higher than 3.0 V.

The invention claimed is:

1. A coin type battery comprising:
    a battery case having a bottom plate and a side portion rising from a rim of the bottom plate;
    a sealing plate having a top plate and a rim portion extending from the top plate to an inside of the side portion;
    a gasket compressed and interposed between the side portion and the rim portion; and
    a power generation element sealed by the battery case and the sealing plate, wherein:
    at least one of the battery case and the sealing plate includes:
        a substrate layer having a first surface and a second surface opposite to the first surface; and
        a plated layer plated on the first surface layer of the substrate,
    the plated layer is disposed on an outer surface side of the coin type battery,
    the substrate layer is disposed closer to the power generation element than the plated layer, and
    the plated layer includes nickel, and further includes at least one selected from the group consisting of zinc and tin.

2. The coin type battery according to claim 1, wherein the plated layer includes nickel by 30 mass % or less.

3. The coin type battery according to claim 1, wherein the plated layer includes nickel by 5 to 20 mass %.

4. The coin type battery according to claim 1, wherein the plated layer includes at least tin and zinc.

5. The coin type battery according to claim 4, wherein the plated layer includes zinc by 35 mass % or less.

6. The coin type battery according to claim 1, wherein a thickness of the plated layer is 0.5 to 10 μm.

7. The coin type battery according to claim 1, wherein the substrate layer includes stainless steel.

8. The coin type battery according to claim 1, wherein a Ni plated layer is further plated on the second surface of the substrate layer.

* * * * *